(12) United States Patent
Newcomb et al.

(10) Patent No.: US 6,805,074 B2
(45) Date of Patent: Oct. 19, 2004

(54) SYSTEM AND METHOD OF CUSTOMIZING AN ANIMAL FEED BASED ON HEAT INCREMENT

(75) Inventors: Mark D. Newcomb, Independence, MN (US); Christiaan P. A. van de Ligt, Elk River, MN (US); David A. Cook, Coon Rapids, MN (US); David G. Cieslak, Saint Michael, MN (US)

(73) Assignee: Cargill, Incorporated, Minneapolis, MN (US)

( * ) Notice: Subject to any disclaimer, the term of this patent is extended or adjusted under 35 U.S.C. 154(b) by 0 days.

(21) Appl. No.: 10/328,456

(22) Filed: Dec. 23, 2002

(65) Prior Publication Data

US 2004/0118351 A1 Jun. 24, 2004

(51) Int. Cl.[7] ............ A01K 1/10; A01K 39/00; A01K 5/00
(52) U.S. Cl. ............ 119/51.01; 426/807; 426/53; 340/500; 340/540; 340/573.3; 119/174; 119/421; 700/90
(58) Field of Search ............ 119/51.02, 51.01, 119/421, 174; 340/500, 540, 573.3; 426/807, 53; 900/90

(56) References Cited

U.S. PATENT DOCUMENTS

| | | | |
|---|---|---|---|
| 4,517,923 A | * 5/1985 | Palmer | 119/51 |
| 4,712,511 A | 12/1987 | Zamzow et al. | |
| 4,729,894 A | * 3/1988 | Teeter | 424/153 |
| 5,105,767 A | 4/1992 | Gordon et al. | |
| 5,174,244 A | * 12/1992 | Gaalswyk | 119/51.01 |
| 5,355,833 A | 10/1994 | Legrain | |
| 5,474,085 A | 12/1995 | Hurnik et al. | |
| 5,478,989 A | 12/1995 | Shepley | |
| 5,595,444 A | 1/1997 | Tong et al. | |
| 5,668,718 A | 9/1997 | Liu et al. | |
| 5,843,498 A | * 12/1998 | Takahashi | 426/2 |
| 6,076,043 A | 6/2000 | Liu | |
| 6,082,304 A | * 7/2000 | Crain | 119/421 |
| 6,115,692 A | 9/2000 | Liu et al. | |
| 6,135,055 A | 10/2000 | Pratt | |
| 6,394,963 B1 | 5/2002 | Blazey et al. | |
| 6,556,948 B1 | * 4/2003 | McKenna | 702/173 |

FOREIGN PATENT DOCUMENTS

| | | | | |
|---|---|---|---|---|
| EP | 0 715 806 A1 | | 6/1996 | |
| WO | WO 00/41575 | * | 7/2000 | ............ A23K/1/18 |
| WO | WO 0154043 A1 | | 7/2001 | |
| WO | WO 02/47473 A2 | | 6/2002 | |

OTHER PUBLICATIONS

Effect of Roughage Level and Ambient Temperature on Milk Production, Milk Composition and Ruminal Volatile Fatty Acids, Abstract from Tropical Agriculture vol. 52, Stanley et al, 1975, 1 page.*

Bernard Devreese, "Nutrient Levels In Some Commercial Shrimp Feeds And Feed Ingredients Of Asia And Latin America—A Comparative Analysis," Inve Aquaculture N.V.Oeverstraat, 7 B–9200 Belgium, pp. 49–70.

(List continued on next page.)

Primary Examiner—Peter M. Poon
Assistant Examiner—Andrea M. Valenti
(74) Attorney, Agent, or Firm—Foley & Lardner LLP (57) ABSTRACT

A system for and method of determining a formulation for an animal feed having a customized heat increment value. The system can include an animal profile, an animal nutrient requirement profile, an evaluation criteria, and/or ingredient nutrient content profiles. The information contained in the profiles and criteria can be used to calculate a formulation having a desirable heat increment value. The heat increment value can be used to maximize satisfaction of an evaluation criteria.

21 Claims, 2 Drawing Sheets

OTHER PUBLICATIONS

Schematic representation of computer system commercially used by Cargill, Inc. prior to Dec. 1999, 1 page (Nutrient Gap Flowchart).

Schematic representation of computer system commercially used by Cargill, Inc. prior to Jun., 2001, 3 pages, (Figures 1–3 from WO 02/47473).

Derwent Abstract of SU 843 889; Accension No. 1982–E59773.

Derwent Abstract of EP 0715 806 A1; Accension No. 1996–260514.

US patent Application No. US20020082486A1.

Partial English Translation for JP 8052116 from esp@cenet database.

Partial English Translation for JP 9028678 from esp@cenet database.

* cited by examiner

SYSTEM AND METHOD OF CUSTOMIZING AN ANIMAL FEED BASED ON HEAT INCREMENT

BACKGROUND OF THE INVENTION

The present invention relates generally to a computerized system for determining a customized feed for animals, such as cattle, swine, poultry, equines, fish, crustaceans, and the like. More particularly, the present invention relates to determining a feed mix that is formulated to produce a heat increment value based on animal needs and/or characteristics, available ingredients, and cost of production.

In general, animal feed products are compositions of a large variety of raw materials or ingredients. The ingredients can be selected to optimize the amount of any given nutrient or combination of nutrients in an animal feed product based upon the nutrient composition of the ingredients used.

The nutritional composition of any one feed ingredient can be used in combination with the nutritional composition of every other ingredient in the feed to produce an animal feed that maximizes or minimizes an evaluation criteria. One example of an evaluation criteria is the growth and production rate of the animal in the shortest amount of time. Other examples of evaluation criteria can include, but are not limited to, a work rate for an animal, an appearance of an animal, a health state of an animal, etc. Animal feed producers have recognized that certain nutritional compositions help animals to meet or exceed evaluation criteria better than other nutritional compositions. For example, a particular cow feed composition can be made that will deliver an improved balance of essential amino acids post ruminally. This has has been shown to have the effect of increasing the cow's milk production.

Similarly, animal feed producers have recognized that certain environmental factors or environmental conditions can impede animals in meeting or exceeding evaluation criteria. For example, diseased or stressed animals, or animals that are exposed to excessive heat for extended durations are less likely to meet evaluation criteria.

Maximizing the speed and frequency with which animals meet the evaluation criteria generally is desirable. Maximizing criteria satisfaction also may include maximizing some positive criteria, such as total muscle gain, or minimizing a negative criteria, such as diminished gains or even losses during heat stress.

A composition can be used in several forms: complete feed form, concentrate form, blender form and base mix form. An example of the complete feed form can include wheat middlings, corn, soybean meal, corn gluten meal, distillers grains or distillers grains with solubles, blood meal, salt, macro-minerals, trace minerals, and vitamins.

Further, animal feed producers have recognized that desirable nutritional composition changes depending on the developmental stage of the animal in question (e.g. newborn, weaning, gestating). The ideal nutrient composition can also change based on additional factors, including the health of the animal and whether the animal is nursing. Therefore, animal feed producers have recognized that by mixing ingredients to produce an ideal nutritional composition for particular animals at particular growth stages, they can meet evaluation criteria.

Thus, there is a continuing need for methods and systems for maximizing nutritional criteria satisfaction. Further, there is a need for a system and method to create a customized animal feed formulated to satisfy some requirement.

SUMMARY OF THE INVENTION

An exemplary embodiment of the present invention is related to a system for determining a customized feed for at least one animal. The determination of the customized feed includes generating a customized feed formulation based on a nutritional profile including a desirable heat increment.

An exemplary embodiment is related to a system for determining a customized feed for at least one animal. The system can include a first memory portion configured to store animal data representative of the characteristics of the animal, a second memory portion configured to store feed data representative of feed ingredients, and a data processing circuit in communication with the memory portions and configured to generate a nutritional profile including a desirable heat increment value for the animal based upon the animal data. The data processing circuit can be further configured to generate formulation data representative of a combination of feed ingredients. The formulation data can be generated by the data processing circuit based upon the nutritional profile data and the feed data.

An exemplary embodiment is related to a system for determining customized feed for at least one animal. The system can include a first memory portion configured to store animal data representative of the characteristics of the animal, a second memory portion configured to store feed data representative of feed ingredients, a third memory portion configured to store evaluation data representative of at least one evaluation criteria, and a data processing circuit in communication with the memory portions and configured to generate a nutritional profile including a desirable heat increment value for the animal based upon the animal data. The data processing circuit can be further configured to generate formulation data representative of a combination of feed ingredients. The formulation data can be generated by the data processing circuit based upon the nutritional profile data, the feed data and the evaluation data.

Another exemplary embodiment is related to a system for determining customized feed for at least one animal. The system includes a first memory means for storing animal data representative of the characteristics of the animal, a second memory means for storing feed data representative of feed ingredients, a third memory means for storing evaluation data representative of at least one evaluation criteria, and a processing means for generating nutritional profile data representative of a desirable heat increment value for the animal based upon the animal data. The processing means can generate formulation data representative of a combination of feed ingredients. This formulation data can be generated based upon the nutritional profile data, the feed data and the evaluation data.

Another exemplary embodiment can be related to a method for determining customized feed for at least one animal. The method can include storing animal data representative of the characteristics of the animal, storing feed data representative of feed ingredients, generating nutritional profile data including a representation of a desirable heat increment value for the animal based upon the animal data, and generating formulation data representative of a combination of feed ingredients. The formulation data can be generated based upon the nutritional profile data and the feed data.

Another exemplary embodiment can be related to a method for determining customized feed for at least one animal. The method can include storing animal data representative of the characteristics of the animal, storing feed data representative of feed ingredients, storing evaluation data representative of at least one evaluation criteria, generating nutritional profile data including a representation of a desirable heat increment value for the animal based upon the animal data, and generating formulation data representative of a combination of feed ingredients. The formulation data can be generated based upon the nutritional profile data, the feed data, and the evaluation data.

Other principle features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals depict like elements, and.

DETAILED DESCRIPTION OF THE PREFERRED EMBODIMENTS

A system for and method of customizing an animal feed to yield a desirable heat increment value are described. In the following description, for the purposes of explanation, numerous specific details are set forth in order to provide a thorough understanding of the present invention. It will be evident, however, to one skilled in the art that the exemplary embodiments may be practiced without these specific details. In other instances, structures and device are shown in diagram form in order to facilitate description of the exemplary embodiments.

In at least one exemplary embodiment illustrated below, a computer system is described which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hardwired circuitry may be used in place of, or in combination with, software instructions to implement the functions described. Thus, the embodiments described herein are not limited to any particular source for the instructions executed by the computer system.

Figure 1:
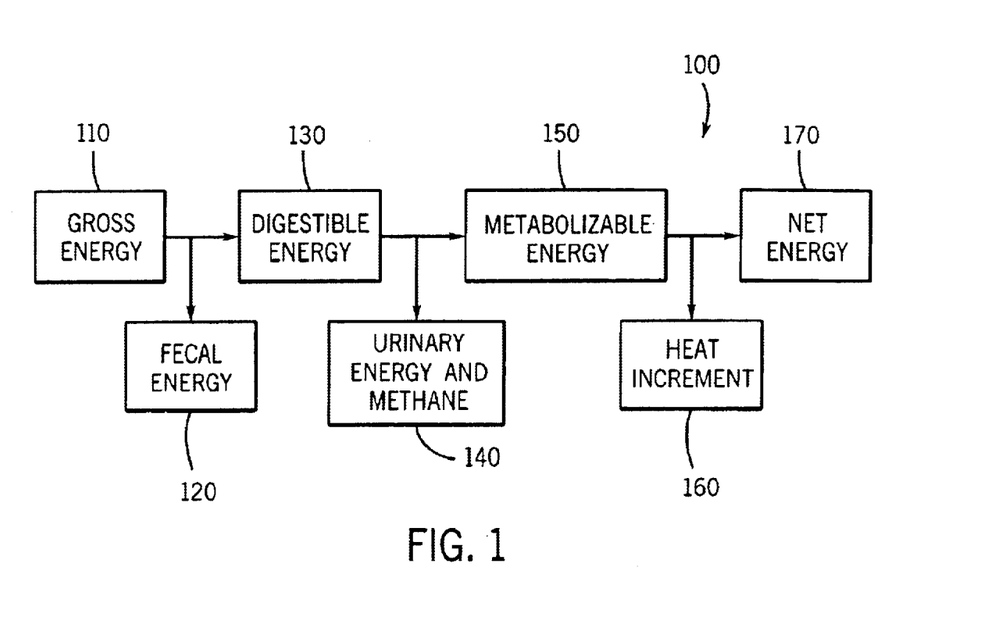
FIG. 1 is a flow chart, illustrating the breakdown of gross energy eaten by an animal into net energy usable by the animal according to an exemplary embodiment.

Referring to FIG. 1, FIG. 1 illustrates a flow diagram 100 depicting energy utilization in the digestive process of an animal. A gross energy 110 is the amount of energy present in the dietary intake of an animal. The conservation of energy principle teaches that this amount of energy will be either utilized by the animal during the digestive process or discarded as waste. The energy level of the dietary intake of the animal is generally measured in terms of calories/gram or kilocalories/kilogram, mega-Joules/kilogram, or any other designation of energy per unit weight.

A fecal energy 120 is the amount of energy that is discarded by the animal as fecal waste. Gross energy 110 minus fecal energy 120 yields a digestible energy 130. Digestible energy 130 is energy that can potentially be absorbed by the animal during the digestive process.

However, not all of digestible energy 130 is energy that an animal can actually use for productive purposes. A certain amount of the energy is lost as urinary energy and methane 140. Digestible energy 130 minus urinary energy and methane 140 yields a metabolizable energy 150.

Some of metabolizable energy 150 is lost in the conversion from metabolizable energy 150 to a net energy 170. The net energy 170 is the amount of energy that is absorbed by the animal for use by the animal in providing energy for body system functions including, but not limited to, tissue growth, milk or egg production, conceptus growth, wool/hair/feather production, maintenance of existing body tissue, energy for voluntary body functions (i.e. movement), and/or productive work. The energy that is given off in converting the feed ingredient that constitute metabolizable energy 150 to net energy 170 is called the heat increment 160.

The heat increment 160 is the increase in heat production following consumption of food by an animal in a thermoneutral environment. The heat increment can include heats of fermentation, digestion and absorption, product formation, and waste formation and excretion. The heat increment produced by a nutrient composition having a given metabolizable energy 150 is variable depending on the chemical composition of the feed ingredients that make up the metabolizable energy 150. For example, in the chemical reaction that occurs in processing fat derived metabolizable energy, little heat is produced. Accordingly, heat increment 160 would be relative small where the nutrient composition having metabolizable energy 150 was composed of mostly fat. In contrast, the heat produced in processing a nutrient composition composed of neutral detergent fiber derived metabolizable energy can be relatively high.

Accordingly, heat increment 160 is the energy that is generated by digestion and metabolism of absorbed nutrients into body tissue. In cold weather, the heat increment may help to keep the animal warm. Accordingly, it may be desirable in cold weather to customize an animal feed to provide a large heat increment to prevent the usage of net energy for non-productive purposes, i.e. shivering. In hot weather, the heat increment may contribute to heat stress of an animal and reduce productivity. Accordingly, it may be desirable in hot weather to customize an animal feed to provide a smaller heat increment to prevent causing heat stress to an animal. Heat stress can cause a reduction in the overall feed intake of an animal, dropping the available net energy below what is required to meet or exceed evaluation criteria. In the extreme case, heat stress can even cause loss of the animal.

Table A below is a set of data illustrating the nutrient requirements of swine according to an exemplary embodiment. Table A includes a metabolizable energy column and a net energy column for several ingredients typically used in swine feed. The heat increment for any ingredient is equal to the difference between the amount shown in metabolizable energy column and net energy column.

TABLE A

Data From Nutrient Requirements of Swine, 1998

| Ingredient | Metabolizable Energy | Net Energy |
|---|---|---|
| Corn | 3420 | 2395 |
| Soybean Meal, Extr | 3180 | 1935 |
| Choice White Grease | 7955 | 5095 |
| Wheat Middlings | 3025 | 1560 |

Nutrient Requirements of Swine (10th Ed.), pp. 126–127, 144, National Research Council, Washington, D.C., National Academy Press 1998.

As shown, in ingredients that are higher in fat, the heat increment is less (relative to metabolizable energy) than for ingredients that are higher in fiber.

The heat increment value for an animal feed may be customized in terms of the total heat increment value present in the feed. Animal feed ingredients have been identified that can be credited with relatively higher or lower heat increment contributions. Ingredients that are generally higher in heat increment contributions include complex carbohydrates and fibers. Ingredients that are generally lower include fats. However, specifically designed formulations can be used to intentionally control the heat increment value provided in an animal feed as a method to modify animal performance.

Table B below includes two sample diets according to an exemplary embodiment. A first diet includes a higher percentage of ingredients that are high in fiber, specifically wheat midds. Accordingly the heat increment for the first diet is relatively high. A second diet includes a higher percentage of ingredients that are lower in fiber. Accordingly the heat increment for the second diet is relatively low.

TABLE B

| | | ME | NE | Heat Increment |
|---|---|---|---|---|
| High Heat Increment Example | | | | |
| Wheat Midds | 20% | 605 | 312 | |
| Corn | 52.81% | 1806 | 1265 | |
| Soybean Meal, Extr | 24.69% | 785 | 478 | |
| Vitamins/Minerals/Others | 2.5% | | | |
| Totals | 100% | 3196 | 2055 | 1142 |
| Low Heat Increment Example | | | | |
| Wheat Midds | 0% | 0 | 0 | |
| Corn | 70.41% | 2408 | 1686 | |
| Soybean Meal, Extr | 27.09% | 861 | 524 | |
| Vitamins/Minerals/Others | 2.5% | | | |
| Totals | 100% | 3269 | 2211 | 1059 |

Figure 2:
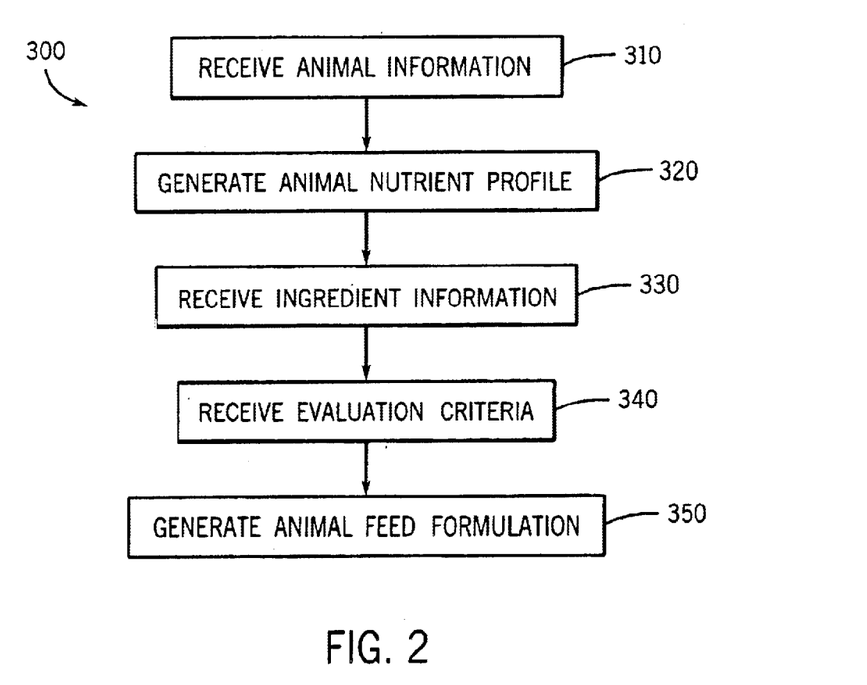
FIG. 2 is a flow chart, illustrating a method of formulating an animal feed having a customized heat increment value.

FIG. 2 illustrates a flow diagram 300 depicting the steps in a method for customizing a heat increment value in an animal feed. The heat increment value in an animal feed refers to any parameter related to the aggregate level and/or relative amount of heat increment associated with the ingredients in an animal feed.

An animal feed with a custom heat increment value is applicable to all livestock, poultry, companion animals, and aquaculture nutritional applications. For illustrative purposes, the method illustrated in FIG. 2 is described with reference to swine.

According to an exemplary embodiment, in a step 310, animal information is received. The animal information can include a type of animal, a body heat state of the animal, an environment of the animal, etc. Types of animals could include bovine, swine, various species of fish, etc. The body heat state of the animal can be described in terms of the variance from a thermally neutral animal. A thermally neutral animal may be defined as an animal whose skin temperature is within a predetermined range of a measured neutral value that is shown to maximize performance of the animal. The variance may be measured in degrees of variance from thermally neutral (i.e. 0.5 degrees above normal or 2 degrees below normal). The skin temperature of an animal can be measured using an infrared gun or any other surface temperature measuring device. One example of such a device is the Cole-Parmer® infrared thermometer produced by Cole Parmer of Vernon Hills, Ill. According to alternative embodiments, internal animal temperature, surface temperature of an animal, or any other measurement indicative of deviation from a thermal neutral can be used to calculate a desired heat increment value.

According to an exemplary embodiment, the animal information can be received using a type of input device associated with a computer, such as a keyboard, a mouse, a voice recognition system, etc. An exemplary computing system is described with reference to FIG. 3. According to an alternative embodiment, the animal information can be received over a communication link, such as a computer network, a phone link, a fax line, standard mail, etc. An exemplary network configuration is described with reference to FIG. 4.

Animal information received in step 310 can be used to generate an animal nutrient requirement profile in a step 320. The animal nutrient requirement profile can include a listing of one or more of the following: proteins, amino acids, carbohydrates, fat, energy, vitamins, and/or minerals requirements. Depending on the sophistication of the profile generation system, the listing can include a greater or fewer number of entries. For example, according to alternative embodiment, the listing can further include the fiber content. The listings may also vary according to the type of animal. According to an alternative embodiment, the animal nutrient requirement profile can include a range of values that represent desirable nutrient levels.

The animal nutrient requirement profile can be a listing of desirable nutrient levels for the animal described in the animal information. The ideal nutrient levels can include a customized heat increment value for the animal described in the animal information. An example can be a healthy, weaning pig nutrient profile which includes about 1–5% fat, 18–30% crude protein, about 3000–3500 kcal/kg metabolizable energy. Where the animal's skin temperature is above thermally neutral, the nutrient profile can further include a requirement of at least 2500 kcal/kg net energy in the diet to maximize growth. Where the animal's skin temperature is below thermally neutral, the nutrient profile in such a diet can include a requirement of at least 2000 kcal/kg net energy in the diet to maximize growth under existing condiitons.

The animal nutrient requirement profile may also include limiting values indicating that an animal feed should not contain more than a given level of a particular nutrient or that the value of a given nutrient should be within a specified range of values. Advantageously, a limiting value can be used to prevent excess utilization of nutrients that, at higher levels, may be growth limiting or even toxic.

In a step 330, ingredient information can be received. The ingredient information can be information related to ingredients to be used in formulation of the animal feed. The ingredient information can include a listing of ingredients available for use in production of an animal feed. The ingredient listing can be a listing of all available ingredients on a national market, a listing of ingredients available in a local market, a listing of ingredients available at a particular site, or any other set or subset of ingredients.

The ingredient information can further include additional information related to the available ingredients. The additional information can include the cost of the ingredient, the ingredient nutrient content profile of the ingredient, any limitations of the availability of the ingredient and any other related information. The cost of the ingredient can be normalized to account for any shipping, storage, or other overhead costs. The ingredient nutrient content profile can be a complete listing of all nutrient levels in an ingredient or a subset of the nutrient levels sufficient to make an analysis. The ingredient nutrient content profile of the ingredient can further include the heat increment value associated with the ingredient. The ingredient listing may vary according to the type of animal to include only ingredients that are used to feed that type of animal.

In a step 340, an evaluation criteria is received. The evaluation criteria may be chosen from a criteria related to animal productivity such as animal production rate (e.g. growth or rate of production of a food product such as meat, milk or eggs), cost of feed per unit animal production rate (e.g. cost of feed per unit animal weight gain or cost of feed per unit milk or egg production), feed weight per unit animal production rate, an index of animal health status, an index of animal work rate, net or gross income per animal, and net or gross income per animal space. The evaluation criteria can be a particular criteria that a producer would like to optimize. For example, a pork producer may wish to optimize rate of gain by selecting a feed which maximizes the rate at which a pig gains weight.

The evaluation criteria can include a single criteria or multiple criteria. If multiple criteria are provided, the criteria can be given weights designating their relative importance in a calculation. As an example, a producer may want to generate an animal feed that is weighted 70% on a animal production rate criteria and 30% on a cost of feed per unit animal production rate basis. Where multiple criteria are used, optimization weighting data may be selected to cause one of the evaluation criteria to have no effect on the generation of the formulation data.

The evaluation criteria can incorporate responses to variations in the heat increment value in an animal feed. Responses to variations in the heat increment value can include increased net energy, caloric intake in heat stress environments, and increased metabolizable energy intake in cold stress environments.

Following the collection of data in step 310 through step 340, a processing step 350 can be performed. The processing step can be performed by a processing means. An exemplary processing means can be a computer as described with reference to FIG. 3. The processing step can use a linear program to generate a profile for an animal feed according to the evaluation criteria provided in step 340. A linear program can be a mathematical model capable of solving problems involving a large number of variables limited by constraints using linear math functions. A variety of different linear math programs capable of solving problems of this type are known to those of skill in the art. One example of a program of this type is commercially available from Format International of St. Louis, Mo. as part of a computer software system for solving complicated multivariable problems.

The linear program can further include functionality to account for different weights associated with multiple evaluation criteria. The incorporation of weighting information in a linear program is known to those of skill in the art.

A processing means which includes the linear program, described with reference to FIG. 2, can take input data (e.g. animal nutrient requirement profile, evaluation criteria, ingredient nutrient content profile, etc.) as a basis to compute animal feed data. Animal feed data can include data specifying a combination of ingredients solution which is solved to fulfill a desired animal nutrient requirement profile which may be based on one or more evaluation criteria.

Advantageously, the method described with reference to FIG. 2 allows a producer to formulate an animal feed formulated to provide a specific heat increment value. Animal feed is customarily formulated to provide a minimum amount of net energy. According to an exemplary embodiment, the feed can also be formulated to include a maximum on the amount of metabolizable energy. By constraining the two factors in calculating the heat increment, this necessarily constrains the heat increment. According to an alternative embodiment, the system can be used to formulate to a target heat increment value based on the heat increment value of the ingredient used an inputs to the formulation system.

The utilization of a heat increment value in swine diets can improve performance when the animal is exposed to heat stress. Generally, an animal in a heat stress situation will respond by reducing intake of an animal feed that includes a high heat increment. This has the effect of reducing overall caloric intake which can cause a failure to meet evaluation criteria. With a low heat increment animal feed, the caloric intake of the animal will be higher, reducing any adverse effects cause by the heat stress. The converse can also apply in cold weather environments.

Figure 3:
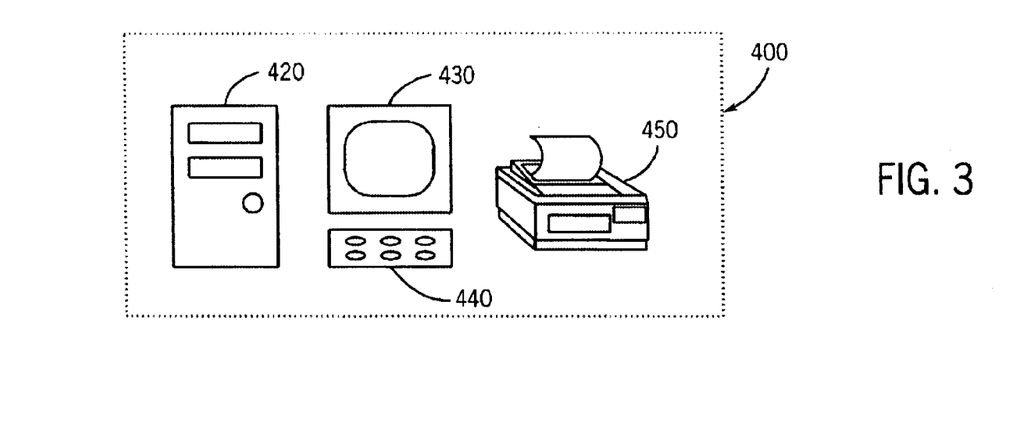
FIG. 3 is a diagrammatical representation of a computer system for use in implementing the animal feed formulation method described in FIG. 2.

FIG. 3 illustrates a computer system 400 that can be used to calculate an animal feed having a customized heat increment value. Computer system 400 can include a processor 410, a memory 420, a visual display unit 430, an input device 440, and an output device 450.

Computer system 400 can be any type of computing device, including work stations, laptops, notebooks, personal digital assistants (PDAs), or other equipment capable of receiving input from input device 440, accessing memory 420, executing a series of instructions and providing an output to visual display unit 430 or output device 450. Processor 420 can be any type of processor capable of executing instructions, such as an Intel® PENTIUM® processor sold by Intel Corp. of Santa Clara, Calif. Visual display unit 430 can be any type of visual display, such as a CRT tube monitor or an LCD display screen. Input device 440 can be a keyboard, a touchpad, voice recognition, file transfer, or any other method or apparatus for communicating information to standalone computing system 400. Output device 450 can be a laser printer, a dot matrix printer, an email program, or any other method or apparatus of communicating information from computer system 400.

According to an exemplary embodiment, a customer seeking a formulation for an animal feed having a customized heat increment value can utilize the methods described with reference to FIG. 2 using computer system 400. The customer can use input device 440 to provide necessary inputs. Computing system 400 can be used to implement an animal feed formulation system in which processor 420 can receive the inputs, access memory 420 for additional required information, and perform necessary calculations.

The results of the analysis can be provided alternatively on visual display unit 430 or output device 450.

Figure 4:
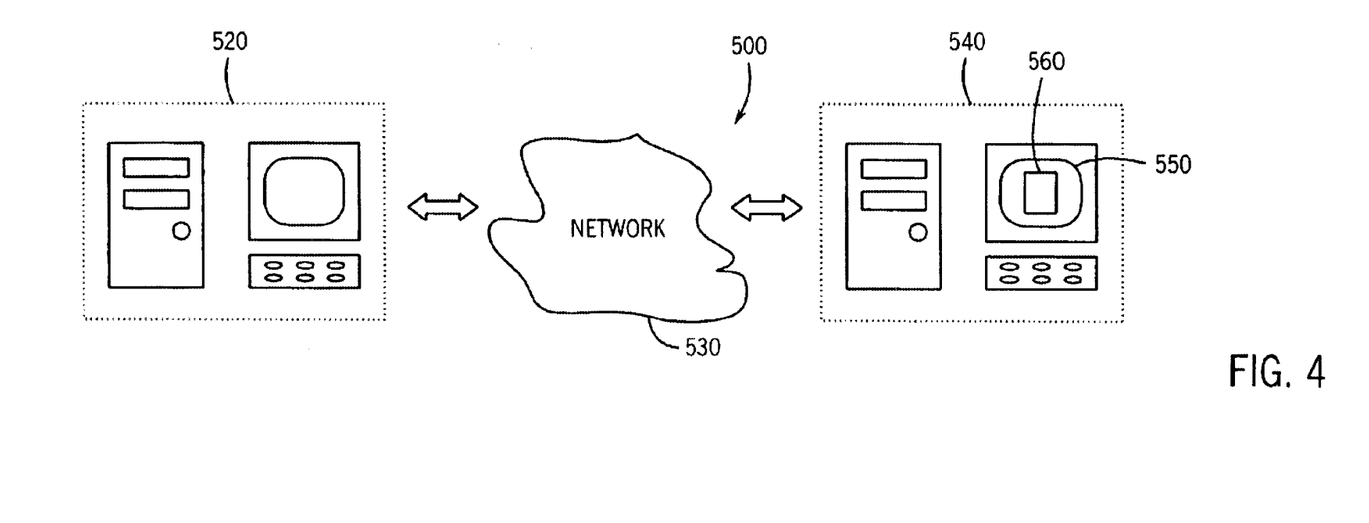
FIG. 4 is a diagrammaticial representation of multiple computers in a networked configuration.

FIG. 4 illustrates a system 500 for providing an animal feed formulation having a customized heat increment value in a network environment. System 500 can include a first computing system 520, a computer network 530, and a second computing system 540. Second computing system 540 further includes a web browsing application 550 capable of displaying a web page 560 provided by first computing system 520.

First computing system 520 and second computing system 540 can be any type of computer system, such as computer system 400, discussed in reference to FIG. 3. First computing system 520 and second computing system 540 further include devices for communicating over network 530.

According to an exemplary embodiment, network 530 is the Internet, a worldwide network of computer networks that use various protocols to facilitate data transmission and exchange. Network 530 can use a protocol, such as the TCP/IP network protocol or the DECnet, X.25, and UDP protocols. According to alternative embodiments, network 530 can be any type of network, such as a virtual private network (VPN), an Ethernet, or a Netware network. Further, network 530 can include a configuration, such as, a wide area network (WAN) or a local area network (LAN). Network 530 preferably provides communication with a Hypertext Markup Language (HTML).

Web browsing application 550 can be any type of application capable of accessing information stored on other computing systems over network 530. Examples can include applications such as Internet Explorer sold by Microsoft Corporation of Redmond, Wash. or Netscape sold by Netscape Communications Inc. of Mountain View, Calif. According to an exemplary embodiment, web browsing application 550 can be used to access first computing system 520, to receive data, and to display web page 560.

According to an exemplary embodiment, a customer seeking to utilize system 500 to obtain an animal feed formulation having a customized heat increment value can access second computing system 540 and run web browsing application 550. Web browsing application 550 can be directed to retrieve web page 560 from first computing system 520 over network 530.

Once retrieved, web page 560 can be used by the customer to provide necessary inputs. The necessary input can include the animal data, available feed ingredients, and evaluation criteria as described with reference to FIG. 2. First computing system can receive the inputs.

Based on the inputs, first computing system 520 can gather necessary data related to the inputs. Examples could include an idealized nutrient profile for the animal described in the animal data, the nutrient profile for the available ingredients listed, etc. Gathering necessary data can include accessing stored values available locally or over the network.

The data can then be utilized as input to a linear math program, described with reference to FIG. 2, to generate an animal feed formulation. First computing system 520 can then transfer the animal feed formulation to second computing system 540 over network 530 for display on web page 560.

Although ingredients naturally have a heat increment value, it may be advantageous to utilize an ingredient that has a relatively higher or lower heat increment value. Ingredients that include high levels of fat tend to have a relatively low heat increment value. Ingredients that are higher in fiber content tend to be associated with a higher heat increment value, as show in Tables A and B above. Some processing methods may increase or decrease the heat increment value of an ingredient by altering the chemical structure of the ingredient to improve the metabolic conversion of metabolizable energy to net energy.

Advantageously, a single ingredient with a higher or lower heat increment value allows the producer greater flexibility to satisfy other evaluation criteria in addition to a heat increment value. It can also provide a cost benefit in reducing the mass of material, possibly having surplus nutrients, that must be utilized to meet heat increment value requirements.

While the exemplary method described above yields a product with a customized heat increment value, any ingredient can be used to modify the heat increment value of an animal feed. The ingredients can be naturally occurring or produced as a result of a processing method.

While the exemplary embodiments illustrated in the figures and described above are presently preferred, it should be understood that these embodiments are offered by way of example only. Other examples may include, for example, a wide variety of ways to convey information regarding animal information or formulations having a customized heat increment value such as, wireless application protocol (WAP), personal digital assistant (PDA) protocols, and other presentation means. Further, while exemplary embodiments describe the invention in the context of livestock feed, the invention may extend to other types of animal feed in which a customized heat increment value is advantageous. Further still, while the above described embodiment described customizing the heat increment value for an animal feed, the invention may extend to formulating an animal feed additive with a customized heat increment value. Additionally, specific information is described above as coming from specific sources for use in the system and method, but any information that is relevant, from any source, can be used in the calculations. The invention is not limited to a particular embodiment, but extends to various modifications, combinations, and permutations that nevertheless fall within the scope and spirit of the appended claims.

What is claimed is:

1. A method for determining customized feed for at least one animal, the method comprising:
   receiving animal data representative of the characteristics of the animal;
   receiving feed data representative of feed ingredients;
   generating nutritional profile data representative of a desirable heat increment value for the animal based upon the animal data; and
   generating formulation including data representative of a combination of feed ingredients, formulation data being generated based upon the nutritional profile data and the feed data; wherein the nutritional profile data is representative of at least two nutrient components and further including storing variation data representative of a range for at least one of the nutrient components of the nutritional profile and generating a set of formulation data based upon the variation data.

2. The method of claim 1, wherein the nutritional profile includes a heat increment value determined to optimize a criteria based upon the animal data.

3. The method of claim 1, wherein the animal data is representative of a body heat state of the animal.

4. The method of claim 3, wherein the body heat state of the animal is described with reference to increments of variance from a thermal neutral animal.

5. The method of claim 1, wherein the feed data includes heat increment values for the feed ingredients.

6. The method of claim 1, wherein the feed ingredients include at least one of a carbohydrate source, a protein source, a fat source, a vitamin source, and a mineral source.

7. The method of claim 1, further including receiving evaluation data representative of at least two evaluation criteria wherein the evaluation criteria includes at least one of an animal production rate, an animal work rate, an animal appearance measurement, a cost of feed per unit animal production rate, and a feed weight per unit animal production rate.

8. The method of claim 7, further including receiving optimization weighting data representative of the effect a respective evaluation data has on the generation of the formulation data and generating the formulation data based upon the optimization weighting data.

9. A method for determining customized feed for at least one animal, the method comprising:

receiving animal data representative of the characteristics of the animal;

receiving feed data representative of feed ingredients;

receiving evaluation data representative of at least one evaluation criteria;

generating nutritional profile data representative of a desirable heat increment value for the animal based upon the animal data; and generating formulation including data representative of a combination of feed ingredients, formulation data being generated based upon the nutritional profile data, the feed data, and the evaluation data; wherein the nutritional profile data is representative of at least two nutrient components and further including storing variation data representative of a range for at least one of the nutrient components of the nutritional profile and generating a set of formulation data based upon the variation data.

10. The method of claim 9, wherein the nutritional profile includes a heat increment value determined to optimize a criteria based upon the animal data.

11. The method of claim 9, wherein the feed data includes heat increment values for the feed ingredients.

12. The method of claim 9, wherein the animal data is representative of at least one of a beginning weight of the animal, a desired weight of the animal, an environment of the animal, a production state of the animal, a body heat state of the animal, a feed form, and an actual or desired production level of the animal.

13. The method of claim 9, wherein the body heat state of the animal is described with reference to increments of variance from a thermal neutral animal.

14. A method for optimizing the growth rate of an animal, the method comprising:

receiving animal data representative of the characteristics of the animal;

receiving feed data representative of feed ingredients;

receiving evaluation data representative of at least two evaluation criteria;

generating nutritional profile data including a data representative of a desirable heat increment value for the animal based upon the animal data; and generating formulation data representative of a combination of feed ingredients, formulation data being generated based upon the nutritional profile data, the feed data and the evaluation data; wherein the nutritional profile data is representative of at least two nutrient components and further including storing variation data representative of a range for at least one of the nutrient components of the nutritional profile and generating a set of formulation data based upon the variation data.

15. The method of claim 14, wherein the nutritional profile includes a heat increment value determined to optimize a criteria based upon the animal data.

16. The method of claim 14, wherein the formulation data is used to create an animal feed having a customized heat increment value.

17. The method of claim 14, wherein the method is utilized in production of a food product from an animal fed the animal feed.

18. The method of claim 14, wherein the feed data includes heat increment values for the feed ingredients.

19. The method of claim 14, wherein the body heat state of the animal is described with reference to increments of variance from a thermal neutral animal.

20. The method of claim 14, further including receiving optimization weighting data representative of the effect a respective evaluation data has on the generation of the formulation data and generating the formulation data based upon the optimization weighting data.

21. The method of claim 20, wherein the optimization weighting data may be selected to cause one of the evaluation criteria to have no effect on the generation of the formulation data.

* * * * *

UNITED STATES PATENT AND TRADEMARK OFFICE
CERTIFICATE OF CORRECTION

PATENT NO. : 6,805,074 B2  Page 1 of 1
APPLICATION NO. : 10/328456
DATED : October 19, 2004
INVENTOR(S) : Mark D. Newcomb et al.

It is certified that error appears in the above-identified patent and that said Letters Patent is hereby corrected as shown below:

Column 10,
Line 45, "representative of the characteristics" should be -- representative of characteristics --

Column 10,
Line 52, "ingredients, formulation data" should be -- ingredients, the formulation data --

Column 11,
Line 20, "representative of the characteristics" should be -- representative of characteristics --

Column 11,
Line 30, "ingredients, formulation data" should be -- ingredients, the formulation data --

Column 12,
Line 6 , "representative of the characteristics" should be -- representative of characteristics --

Column 12,
Line 17, "ingredients, formulation data -" should be -- ingredients, the formulation data --

Signed and Sealed this

Fourteenth Day of September, 2010

David J. Kappos
*Director of the United States Patent and Trademark Office*